United States Patent
Kohlndorfer et al.

[11] Patent Number: 5,967,441
[45] Date of Patent: Oct. 19, 1999

[54] SEAT BELT RETRACTOR WITH TORSION BAR AND ROTATION LIMIT

[75] Inventors: Kenneth H. Kohlndorfer, Roseville; Mark F. Gray, Sterling Heights, both of Mich.

[73] Assignee: Breed Automotive Technology, Inc., Lakeland, Fla.

[21] Appl. No.: 08/898,136

[22] Filed: Jul. 22, 1997

[51] Int. Cl.⁶ ................................................. B60R 22/28
[52] U.S. Cl. ........................................................ 242/379.1
[58] Field of Search ................ 242/379.1; 280/805, 280/806; 297/471, 472, 478

[56] References Cited

U.S. PATENT DOCUMENTS

| | | | |
|---|---|---|---|
| 3,857,528 | 12/1974 | Fiala | 242/379.1 |
| 3,961,761 | 6/1976 | Wiesbock | 242/379.1 |
| 3,970,265 | 7/1976 | Kopke et al. | 242/379.1 |
| 4,322,046 | 3/1982 | Tanaka et al. | 242/379.1 |
| 5,618,006 | 4/1997 | Sayles | 242/379.1 |
| 5,626,306 | 5/1997 | Miller et al. | 242/379.1 |
| 5,794,877 | 8/1998 | Ono et al. | 242/379.1 |

*Primary Examiner*—John M. Jillions
*Attorney, Agent, or Firm*—Markell Seitzman

[57] ABSTRACT

A seat belt retractor (20) comprising: a frame (22); a hollow spool (30) for carrying a length of a seat belt (32), the spool rotationally supported upon the frame (22); a torsion bar (70), which when stressed can twist or rotate, having a first end (74) secured to a first end (48) of the spool (30) and a second end (76); a locking mechanism (200, 202, 210, 220, 222) for preventing the second end of the torsion bar (70) from rotating during an emergency; and a stopping mechanism (90, 110) located interior to the spool (30) for limiting the twisting of the torsion bar to a predetermined number of revolutions.

11 Claims, 5 Drawing Sheets

SEAT BELT RETRACTOR WITH TORSION BAR AND ROTATION LIMIT

BACKGROUND AND SUMMARY OF THE INVENTION

The present invention relates to occupant safety systems and more particularly to an energy absorbing or dissipating seat belt retractor using a torsion bar.

Seat belt retractors using torsion bars to absorb or dissipate energy during an accident have been proposed in U.S. Pat. No. 3,970,265. U.S. Pat. No. 4,322,046 shows an alternate torsion bar retractor having a stop mechanism. This stop mechanism unnecessarily extends the size of one side of the retractor.

The present invention provides a novel way of limiting the rotation of the torsion bar without enlarging the exterior dimensions of the retractor. It is an object of the present invention to provide a simple and reliable stop mechanism for a torsion bar of a seat belt retractor. A further object of the present invention is to provide a stop mechanism that is located internal to the retractor spool.

Accordingly the invention comprises: a seat belt retractor comprising: a frame; a hollow spool, for carrying a length of a seat belt, the spool rotationally supported upon the frame; a torsion bar which when stressed can twist or rotate having a first end secured to a first end of the spool and a second end; locking means secured to the second end of the torsion bar for preventing the second end of the torsion bar from rotating during an emergency; and stop means located interior to the spool for limiting the twisting of the torsion bar to a predetermined number of revolutions.

Many other objects and purposes of the invention will be clear from the following detailed description of the drawings.

DETAILED DESCRIPTION OF THE DRAWINGS

Figure 1:
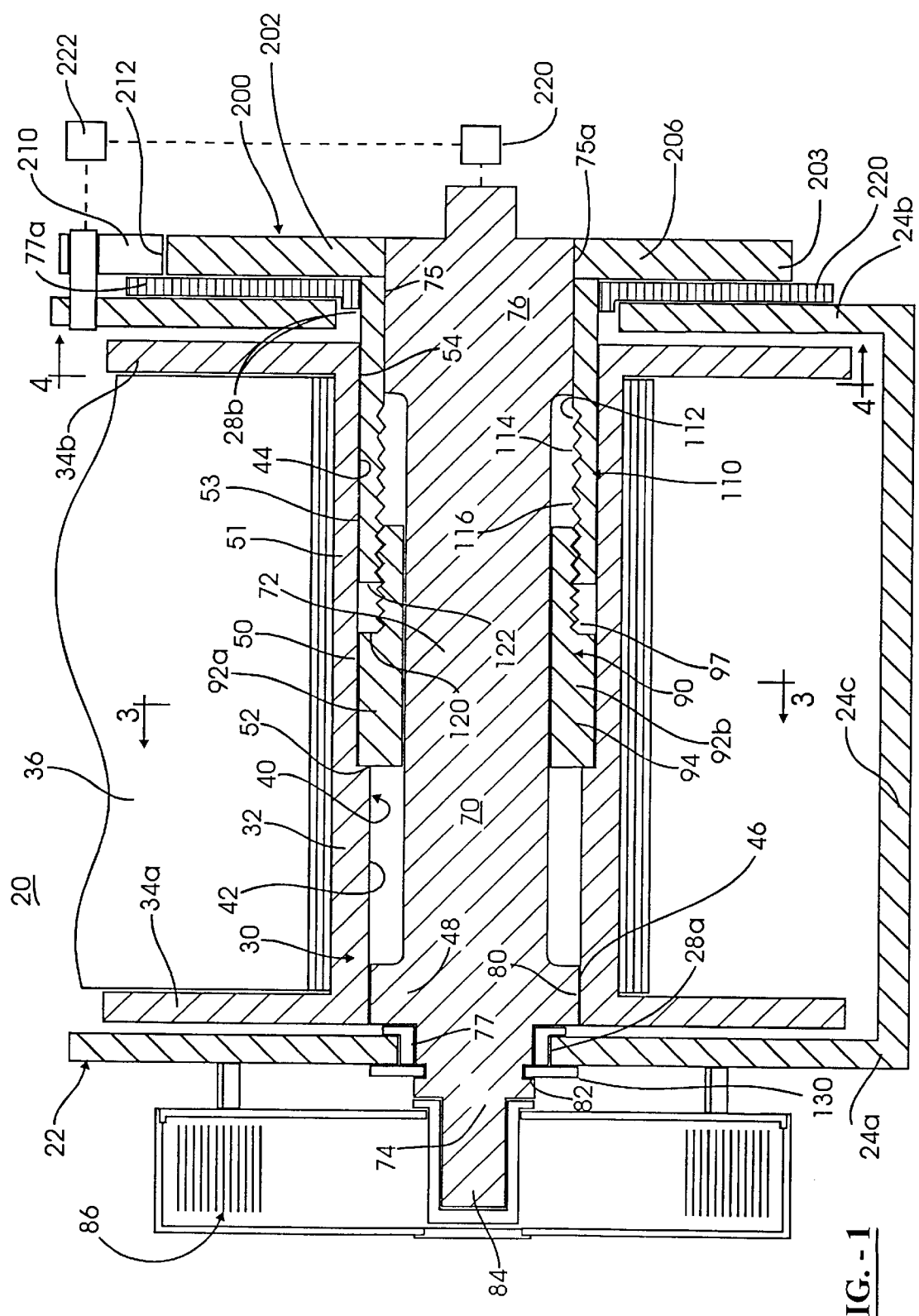
FIG. 1 is a cross-sectional view of a seat belt retractor made in accordance with the present invention.

Reference is made to FIGS. 1–4 which show a seat belt retractor 20 comprising a frame 22 with first and second sides 24a,b and a back 24c, each of the first and second sides includes a first opening 28a,b. The retractor 20 includes a hollow spool 30 rotationally supported upon the frame 22. The spool 30 includes a center body 32 and opposing flanges 34a and 34b at respective ends of the center body 32. The center body 32 includes means such as a slot (not shown) of known construction for receiving and securing an end of a length of seat belt (seat belt webbing) 36. The center body is hollow and includes a stepped bore 40. The stepped bore 40 includes a narrow diameter portion 42 and a large diameter portion 44. The narrow diameter portion 42 includes a first set of splines 46 (also see FIG. 2) at one end 48 thereof. The large diameter portion 44 includes a second set of splines 50 (see FIG. 3) which begins at a shoulder 52, proximate the end of the narrow diameter portion 42. This second set of splines 50 extends about halfway through the large diameter portion 44 of bore 40. Numeral 51 identifies the approximate end of the splines 50. The remaining part 53 of the large diameter portion 44 is smooth. This smooth portion extends from the second set of splines 50 to the end 54 of the bore 40.

A torsion bar 70 is located within the bore 40. The torsion bar includes a center body 72. A first end 74 of the torsion bar 70 extends through opening 28a in side 24a. End 74 may be supported by an optional bushing 77 inserted in opening 28a. The end 74 includes splines 80 (which fit in splines 46), a groove 82 and a spring arbor 84 engageable with a rewind spring 86 (see FIG. 1) and the other end of the spring is fixedly attached relative to the frame so as not to move. The torsion bar also includes a second end 76 which is secured to a part of a lock wheel assembly 200. End 76 includes splines 75 (also see FIG. 4).

Figure 2:
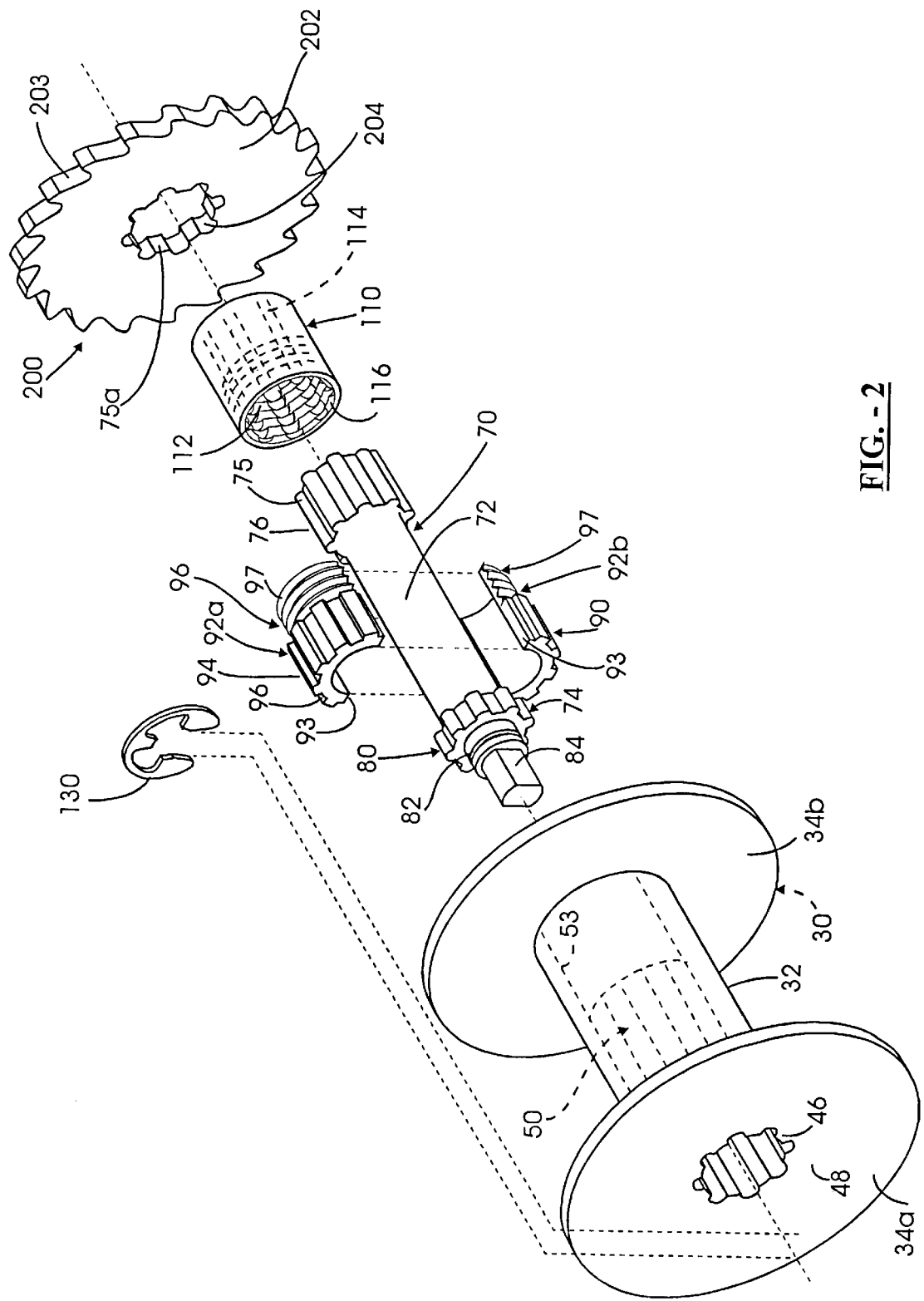
FIG. 2 is an assembly view of many of the major components of the present invention.
Figure 3:
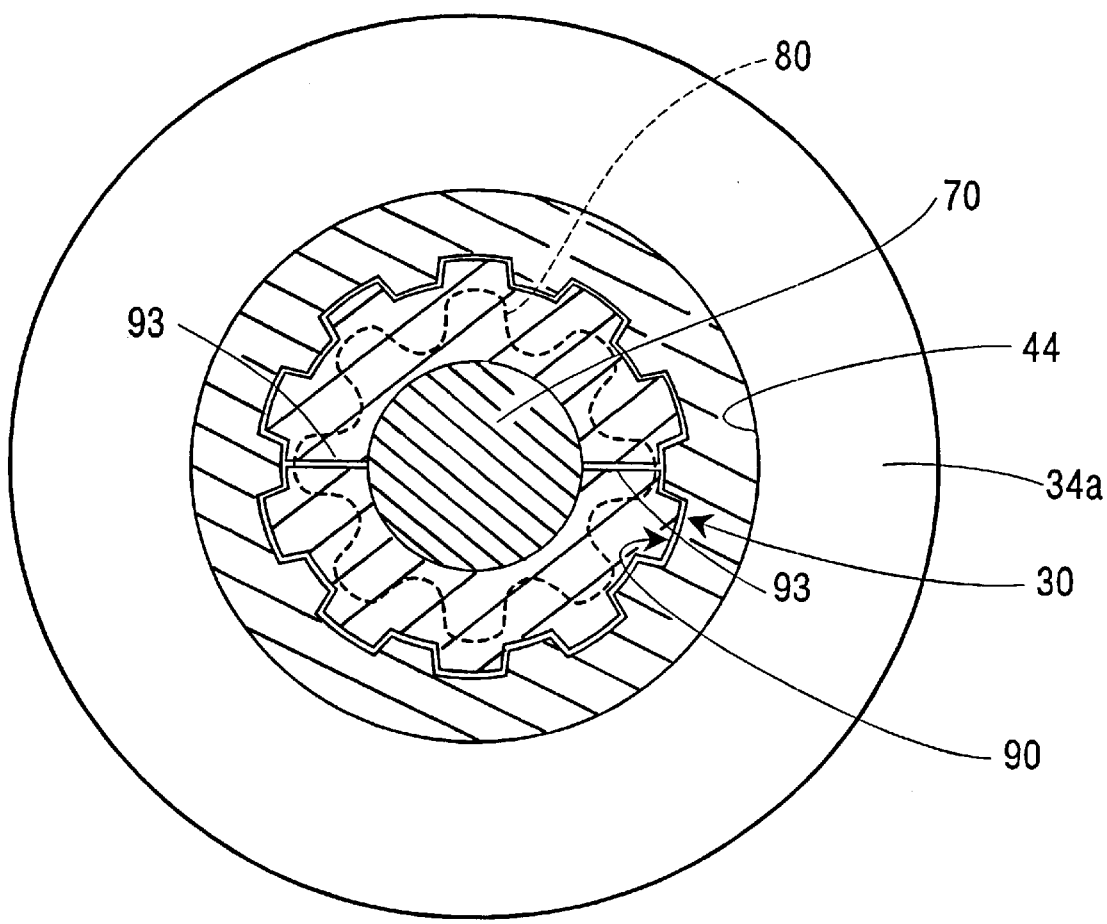
FIG. 3 is a cross-sectional view through section 3—3 of FIG. 1.
Figure 4:
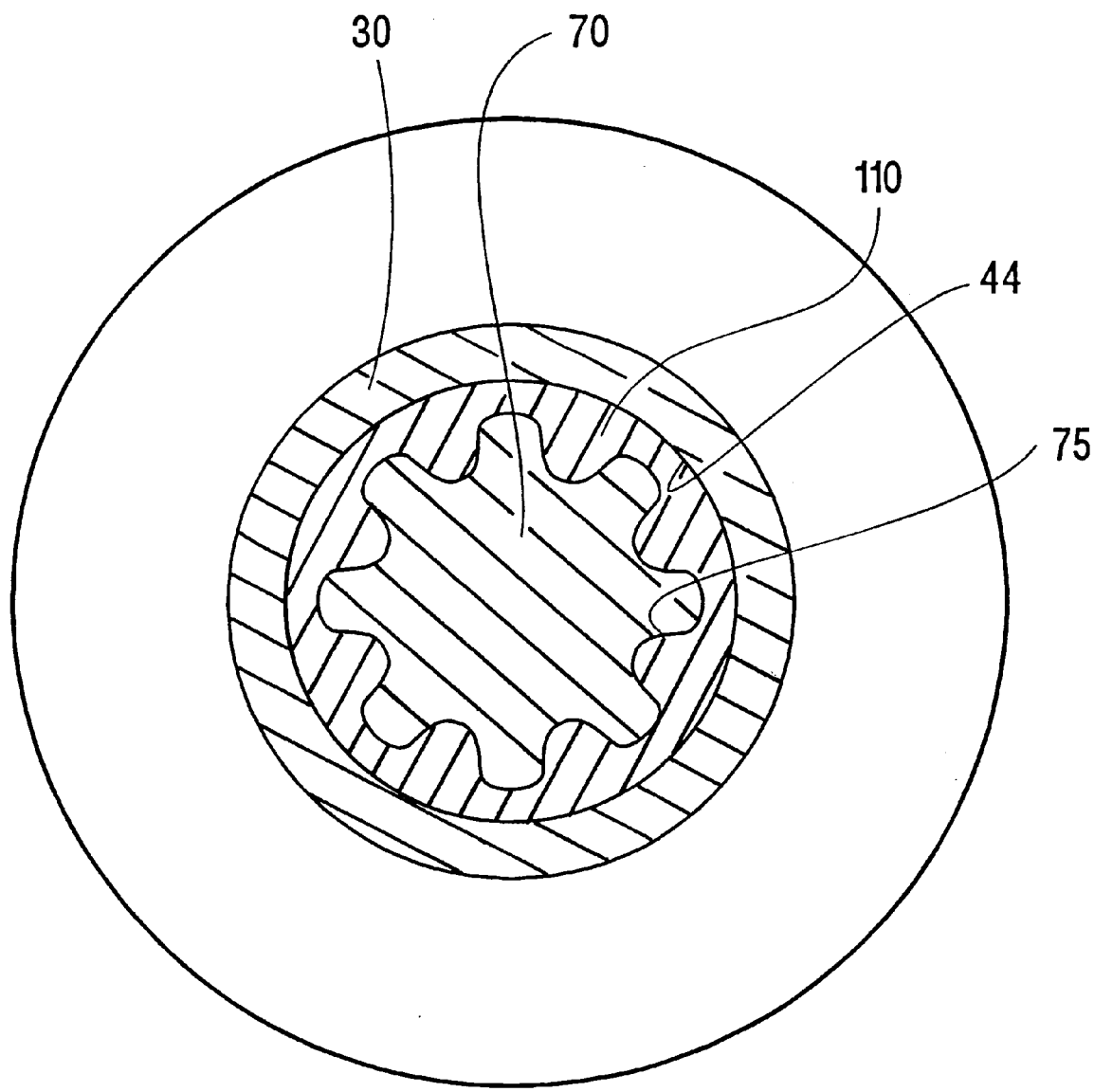
FIG. 4 is a cross-sectional view through section 4—4 of FIG. 1.

Positioned within the center bore 40 of the spool 30 and about the center part of the body 72 of the torsion bar 70 is a split nut 90 also shown in FIG. 2. The split nut 90 includes first and second arcuately shaped half sections 92a,b. Each section 92a,b of the split nut 90 includes a first splined part 94 having splines 96 (also see FIG. 2) on an exterior portion thereof. The splines 96 are sized to fit into the splines 50 within the bore 40 of the spool 30. Each section of the split nut 90 includes a threaded part 97 having threads. When positioned within bore 40, the flat surfaces 93 (see FIG. 2) of each sections half 92a,b contact each other and in this position the split nut 90 completely envelops the torsion bar 70.

Positioned about the end 76 of the torsion bar 70 (see FIG. 2) and within the larger diameter portion 44 of the bore 40 is hollow sleeve 110. The sleeve includes a bore 112. Splines 114 extend through the entire length of the bore 112. About one-half of the length of the bore (and splines) are also threaded at 116, such threads 116 receive the threads 97 of the split nut sections 92a,b. The splines 114 drivingly engage the splines 75 formed on the end 76 of the torsion bar 70.

Emergency locking retractors (ELRs) include a variety of lock wheel assemblies. The precise type for use in the present invention is not particularly important other than, in this embodiment, that a lock wheel needs to be joined to end 76 of the torsion bar. As is known in the art the lock wheel assemblies include a means for causing a locking pawl to be brought into engagement with teeth on the lock wheel to halt the protraction of the seat belt. Such means typically includes the use of a vehicle or inertia sensor to sense vehicle deceleration above a predetermined level and a web sensor which is activated to initiate the locking of the retractor when the seat belt (webbing) is withdrawn from the spool at a rate in excess of a determinable level. The locking assemblies may use one or more plastic sensor pawls which engage a plastic or metal ratchet wheel which in turn couples a lock cup to the retractor shaft (in the present case to the torsion bar). Having coupled the lock cup to the shaft (torsion bar) the lock cup rotates. The motion of the lock cup moves a load absorbing, typically metal, locking pawl into engagement with a load absorbing metal lock wheel, thus halting, if only temporarily (when using energy absorbing components such as a torsion bar), the protraction of the seat belt. One such lock wheel assembly that is usable with the present invention is disclosed in U.S. Pat. No. 5,529,258 or EP 0228729 which are incorporated herein by reference.

With reference to the figures, the lock wheel assembly 200 is shown diagrammatically and includes a lock wheel 202 having a splined bore 204 with splines 75a. The splines 75 of the torsion bar 70 are press fit within the bore 204 and permanently secured thereto in a known manner. This orientation prohibits the relative rotation of the lock wheel 202 and the end 76 of the torsion bar 70. As can be seen in FIG. 1 a portion of the torsion bar 70 extends through opening 28*b* in the frame side 24*b*. An optional bushing 77*a* may be inserted in the opening 28*b* to support the torsion bar 70. The illustrated lock wheel assembly further includes a lock pawl 210, having a locking tooth or formation 212 thereon to engage the teeth 203 on the lock wheel. The lock pawl 210 is rotationally supported on the frame such as on frame side 24*b*. The lock wheel assembly 200 includes a web sensor 220 that is coupled to sense the speed of rotation of the spool 30. As illustrated the web sensor is coupled to the torsion bar 70, the speed of which (prior to lockup) is that of the spool. The lock wheel assembly further includes a vehicle sensor 222. As mentioned above the specific implementation of the web and vehicle sensors will vary, however, this is known in the art. Whenever either the vehicle or the web sensor is activated the lock pawl 210 is brought, via known mechanisms, into locking engagement with a lock wheel 202.

During assembly of the retractor 20, the torsion bar 70 is secured to the lock wheel assembly 200. The sleeve 110 is inserted about the torsion bar 70 and positioned such that the splines 75 and 114 are engaged. The two split nut sections 92*a,b* are then positioned about the center body 72 of the torsion bar and the screwed a determinable amount into the threaded end of the sleeve 110. One relative rotation of the split nut and the sleeve should be sufficient to properly engage these parts. Thereafter the torsion bar 70 (with the split nut 90 and sleeve 110 thereon) is moved into the wide diameter portion of bore 40. As the torsion bar is so moved, the splines 80 (on the end 74 of the torsion bar 70) mate with the splines 46 (on the end of the spool 30) and the split nut sections 90 are caused to rest on the shoulder 52 of the narrow diameter section 42 of the bore 40. In this orientation, the exterior splines 94 (of each section 92*a,b* of the split nut 90) are received within the mating splines 50 in the center of the bore 40 thereby preventing the split nut sections from rotating relative to the spool 30.

The torsion bar 70 is fixed in place by inserting a locking ring 130 within a groove 82 formed on end 74 of the torsion bar. This configuration is also shown in FIG. 2. The rewind spring 86 and sensors 220 and 222 are mounted to the retractor 20 in a known manner.

The operation of the retractor 20 is as follows. During normal operation the spool is rotationally supported on the torsion bar 70 which operates as the shaft of the retractor and the webbing 36 is permitted to protract and retract under the action of forces input on the retractor. The spool is biased to retract the webbing 36 under the action of the rewind spring 86. As there is no relative motion between the ends 74 and 76 of the torsion bar 70 during this time the split nut 90 and sleeve 110 maintain their initial relative positions. During an emergency situation sufficient to activate either of the web sensor 220 or vehicle sensor 222, the lock pawl 210 is moved into engagement with the lock wheel 202, initially stopping the torsion bar 70 and the spool 30 from rotating. As is known in the art, this action in retractors that do not include energy absorbing mechanisms will prevent any further rotation of the spool. This is not the case with the present invention. During an accident, the occupant will move or tend to move forward and load the webbing (with the lock wheel being locked). This load is transferred to the spool and then to the torsion bar 70. From the description above, it can be appreciated that the spool 30 and the torsion bar 70 are joined together only on one side by the splines 46 and 80. With the lock wheel locked and the spool 30 loaded, the torsion bar will begin to twist and the spool begin to rotate allowing the seat belt 36 to protract. The sleeve 110 which is joined to end 76 of the torsion bar 70 will not twist (relative to the torsion bar) as it is joined to the fixed end 76 of the torsion bar 70 via splines 114 and 75. As the torsion bar twists, the spool 30 will rotate relative to the fixed lock wheel (and end 76) and carry with it the split nut 90 (as the split nut sections 92*a,b* and the spool 30 are rotationally joined together by splines 50 and 96). The rotation of the split nut 90 relative to the rotationally fixed sleeve 110 will cause the threads 97 and 116 to advance together. As the spool and the torsion bar 70 continue to rotate, crash energy is absorbed as the torsion bar deforms. As the spool 30 rotates in the direction of seat belt protraction, under control of the deformation characteristics of the torsion bar 70, a determinable amount of webbing is permitted to protract off from the spool. This controlled protraction permits the occupant to move forwardly in a controlled manner. After a predetermined number of revolutions of the torsion bar 70, respective portions 120 and 122 of the split nut 90 and the sleeve 110 butt up against each other preventing any further movement therebetween. Once the split nut 90 is butted against the sleeve 110, the spool 30 and torsion bar 70 become rotationally fixed to the lock wheel and any further rotation of the spool and protraction of the seat belt is prevented. From the description above it can be seen that the amount the seat belt webbing permitted to be protracted is correlatable with the number of rotations (of the torsion bar and the split nut 90) needed to have the split nut 90 bottom out against the mating end 122 of the sleeve. The number of rotations (and the amount of webbing allowed to protract) can be, for example, determined by controlling the pitch of the threads 97 (and 116) or the initial, assembled position of the split nut 90 relative to the sleeve 110.

Figure 5:
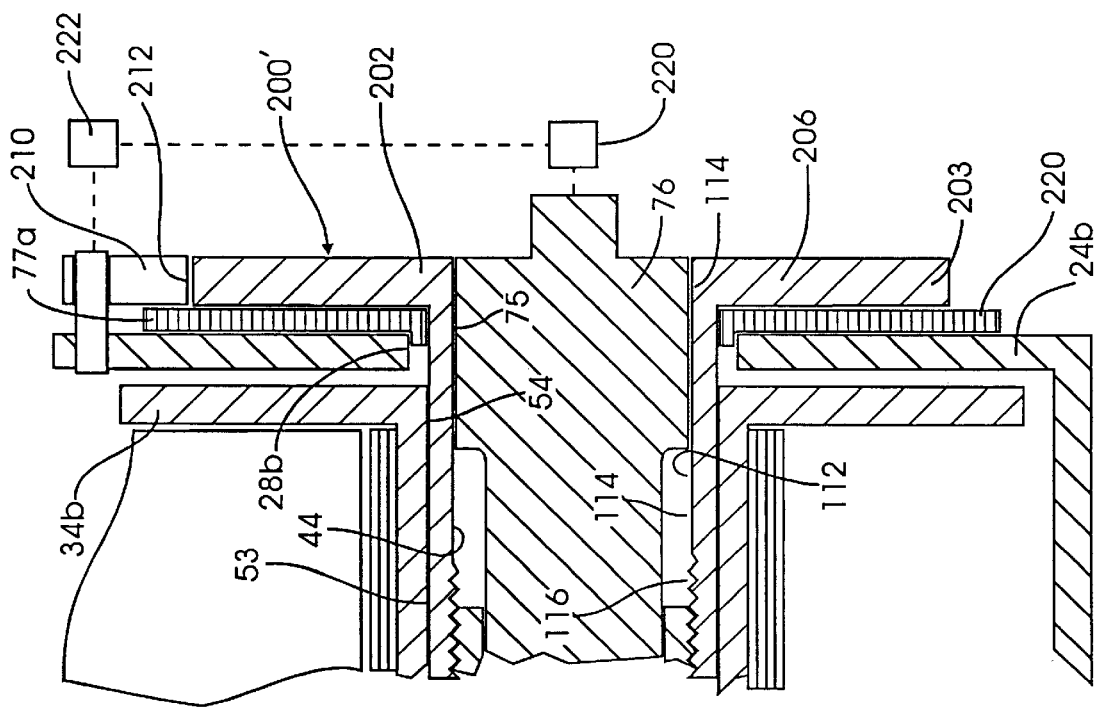
FIG. 5 shows an alternate embodiment of the invention.

Reference is briefly made to FIG. 5 which shows an alternate embodiment of the invention. FIG. 5 is a partial cross-sectional view of the left hand of the retractor 20. In this embodiment the lock wheel 202 and the sleeve 110 are made as an integral component. This combined part may be cold formed. This lock wheel/sleeve 202' also includes a hollow splined bore 112 with splines 114 (similar to bore 112 of sleeve 110) to receive the splines 75 of the torsion bar 70.

Many changes and modifications in the above described embodiment of the invention can, of course, be carried out without departing from the scope thereof. Accordingly, that scope is intended to be limited only by the scope of the appended claims.

We claim:

1. A seat belt retractor (20) comprising:
    a rotatable hollow spool (30,) for carrying a length of a seat belt (32), the spool including a bore;
    energy absorbing means (40) including a deformable member, extending through the bore, for absorbing or dissipating energy as the member is deformed, the energy absorbing member having a first end joined to a first end of the spool;
    locking means (200, 202, 210, 220, 222) for initially halting the rotation of an opposite, second end of the energy absorbing member, and hence also initially halting the rotation of the spool, in a direction of seat belt protraction while not impeding the first end of the energy absorbing member from thereafter rotating;
    stop means (90, 110) located interior of the bore of the spool (30) for limiting the amount of deformation of the energy absorbing means.

2. A seat belt retractor (20) comprising:

a spool (30,) for carrying a length of a seat belt (32), the spool including a hollow bore therethrough;

energy absorbing means (40) including a deformable member for absorbing or dissipating energy as the member is deformed; including a torsion bar, extending through the bore, which when stressed can twist or rotate, the torsion bar having a first end (74) secured to a first end (48) of the spool (30) and a second end (76), lock means, operatively connected to the second end of the torsion bar, for stopping the rotation of the second end of the torsion bar (70) during an emergency; and stop means (90, 110) located interior to the bore of the spool (30) for limiting the deformation or twisting of the torsion bar to a determinable number of revolutions.

3. The retractor (20) as defined in claim 2 wherein the stop means includes a first member (110) rotationally fixed relative to the lock means and a second member (90) movable a determinable distance relative to the first member into a locked condition in response to the twisting motion of the torsion bar thereby halting further rotation of the spool.

4. A seat belt retractor (20) comprising:

a spool (30,) for carrying a length of a seat belt (32);

energy absorbing means (40) including a deformable member for absorbing or dissipating energy as the member is deformed; including a torsion bar which when stressed can twist or rotate, the torsion bar having a first end (74) secured to a first end (48) of the spool (30) and a second end (76), lock means, operatively connected to the second end of the torsion bar, for stopping the rotation of the second end of the torsion bar (70) during an emergency; and stop means (90, 110) located interior to the spool (30) for limiting the deformation or twisting of the torsion bar to a determinable number of revolutions;

wherein the stop means includes a first member (110) rotationally fixed relative to the second end of the torsion bar, and a second member (90) linearly movable a determinable distance relative to the first member in response to the twisting motion of the torsion bar.

5. The retractor as defined in claim 4 wherein the first and second members include surfaces which when mated against each other limit the linear motion to the determinable distance and hence limit the rotation of the torsion bar and spool.

6. The retractor (20) as defined in claim 4 wherein the first member is integral with the lock means.

7. The retractor as defined in claim 4 wherein the second member is rotationally movable and includes a face portion that is linearly movable relative to the first member.

8. A seat belt retractor (20) comprising:

a spool (30,) for carrying a length of a seat belt (32);

energy absorbing means (40) including a deformable member for absorbing or dissipating energy as the member is deformed; including a torsion bar which when stressed can twist or rotate, the torsion bar having a first end (74) secured to a first end (48) of the spool (30) and a second end (76), lock means, operatively connected to the second end of the torsion bar, for stopping the rotation of the second end of the torsion bar (70) during an emergency; and stop means (90, 110) located interior to the spool (30) for limiting the deformation or twisting of the torsion bar to a determinable number of revolutions;

wherein the stop means includes:

a stepped bore (40) within the spool (30);

a nut (90) positioned within the stepped bore (40) including a threaded first end (97);

first means (50, 96) on the stepped bore and on the nut (90) for permitting the nut (90) to translate in correspondence with the rotation of the first end (74) of the torsion bar (70) relative to its opposite end;

a sleeve (110) having a first end linked to the second end of the torsion bar having threads (116) thereon matable with the threads (97) on the nut (90), wherein the threaded portion of the nut (90) bottoms out against the sleeve (110) to limit any further rotation of the torsion bar (70).

9. The retractor (20) as defined in claim 8 wherein the nut (90) includes split nut sections, wherein each section includes a threaded portion (97) and an adjacent splined portion (96).

10. The retractor (20) as defined in claim 9 wherein when each split nut section is mated together they define a hollow structure.

11. A seat belt retractor (20) comprising:

a spool (30,) for carrying a length of a seat belt (32);

energy absorbing means (40) including a deformable member for absorbing or dissipating energy as the member is deformed; including a torsion bar which when stressed can twist or rotate, the torsion bar having a first end (74) secured to a first end (48) of the spool (30) and a second end (76), lock means, operatively connected to the second end of the torsion bar, for stopping the rotation of the second and of the torsion bar (70) during an emergency; and stop means (90, 110) located interior to the spool (30) for limiting the deformation or twisting of the torsion bar to a determinable number of revolutions;

wherein the stop means includes:

a bore (40) within the spool (30);

a nut (90) positioned within the bore (40) including a threaded first end (97);

first means (50, 96) on the bore and on the nut (90) for permitting the nut (90) to translate in correspondence with the rotation of the first end (74) of the torsion bar (70) relative to its opposite end;

a sleeve (110), formed as part of the lock means, having threads (116) thereon matable with the threads (97) on the nut (90), wherein the threaded portion of the nut (90) bottoms out against the sleeve (110) to limit any further rotation of the torsion bar (70).

* * * * *